United States Patent
Hatanaka

(10) Patent No.: US 11,048,232 B2
(45) Date of Patent: Jun. 29, 2021

(54) THREE-DIMENSIONAL DATA GENERATING APPARATUS, RECORDING MEDIUM, AND METHOD USING A CURVE INDICATING A RELATIONSHIP BETWEEN HEIGHT AND DISTANCE

(71) Applicant: Shinichi Hatanaka, Tokyo (JP)

(72) Inventor: Shinichi Hatanaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/558,680

(22) Filed: Sep. 3, 2019

(65) Prior Publication Data

US 2020/0103847 A1 Apr. 2, 2020

(30) Foreign Application Priority Data

Sep. 27, 2018 (JP) .............................. JP2018-182902

(51) Int. Cl.
| | |
|---|---|
| *G05B 19/4099* | (2006.01) |
| *G06T 11/20* | (2006.01) |
| *G06T 15/00* | (2011.01) |
| *G06T 19/20* | (2011.01) |
| *B29C 64/386* | (2017.01) |
| *B33Y 50/00* | (2015.01) |

(52) U.S. Cl.
CPC ........ *G05B 19/4099* (2013.01); *B29C 64/386* (2017.08); *B33Y 50/00* (2014.12);
(Continued)

(58) Field of Classification Search
CPC ...... G05B 19/4099; G05B 2219/35134; G05B 2219/49007; B33Y 50/00; B29C 64/386;
(Continued)

(56) References Cited

U.S. PATENT DOCUMENTS

2003/0071810 A1* 4/2003 Shoov ..................... G06F 30/00
345/420
2017/0185069 A1 6/2017 Haida

FOREIGN PATENT DOCUMENTS

| EP | 3301900 | 4/2018 |
|---|---|---|
| JP | 2017-120571 | 7/2017 |
| JP | 2018-058340 | 4/2018 |

OTHER PUBLICATIONS

NPL Video Titled "How to create a dome in Autodesk Inventor 2014 CAD Tutorial", published Apr. 28, 2014; available for viewing at: https://www.youtube.com/watch?v=RluJacoxvhl; select screenshots included. (Year: 2014).*

(Continued)

*Primary Examiner* — Daniel F Hajnik
(74) *Attorney, Agent, or Firm* — IPUSA, PLLC

(57) ABSTRACT

A three-dimensional data generating apparatus includes an input curve receiving unit configured to receive input of a curve indicating a relationship between a height and a distance from an outline of a target area to each position within the target area, a three-dimensional shape of the target area being generated from a two-dimensional image; and a three-dimensional data generating unit configured to calculate the height at each of the positions within the target area in accordance with the distance, the distance being calculated from a point on the outline to a corresponding position of the positions, and to generate data representing the three-dimensional shape of the target area based on the calculated height.

10 Claims, 14 Drawing Sheets

(52) U.S. Cl.
CPC ............ *G06T 11/206* (2013.01); *G06T 15/00* (2013.01); *G06T 19/20* (2013.01); *G05B 2219/35134* (2013.01); *G05B 2219/49007* (2013.01); *G06T 2200/24* (2013.01); *G06T 2219/2021* (2013.01)

(58) Field of Classification Search
CPC ....... G06T 11/206; G06T 15/00; G06T 19/20; G06T 2200/24; G06T 2219/2021
See application file for complete search history.

(56) References Cited

OTHER PUBLICATIONS

NPL Video Titled "How to Create Realistic Bowl/Utensils in Sketchup", published Jul. 10, 2014; available for viewing at: https://www.youtube.com/watch?v=oy0MmiQHv1g; select screenshots included. (Year: 2014).*

NPL Video Titled "Autodesk Fusion 360—How To Create a Bowl—2 Methods—Revolve & Forms (Reupload)", published Aug. 13, 2017; available for viewing at: https://www.youtube.com/watch?v=ecdhXAgf-N8; select screenshots included. (Year: 2017).*

NPL Video Titled "How to make a skate bowl in SketchUp", published May 23, 2017; available for viewing at: https://www.youtube.com/watch?v=PGbuYWfaFHE; select screenshots included. (Year: 2017).*

NPL Video Titled "Sketchup tutorial—How to make a dome/hemisphere using "Follow Me" in sketchup", published Feb. 26, 2017; available for viewing at: https://www.youtube.com/watch?v=oyfDLoH115Q; select screenshots included. (Year: 2017).*

NPL Video Titled "Modeling an Observation Dome with Timber Arches in SketchUp—SketchUp Quick Modeling", available for viewing at: https://www.youtube.com/watch?v=tXF8qYt3Uqw, published May 8, 2017; select screenshots included. (Year: 2017).*

NPL Video Titled "Uso de Revolve en Fusion 360", available for viewing at: https://www.youtube.com/watch?v=th11qcoHnpU, published Jan. 2018; select screenshots included. (Year: 2018).*

* cited by examiner

THREE-DIMENSIONAL DATA GENERATING APPARATUS, RECORDING MEDIUM, AND METHOD USING A CURVE INDICATING A RELATIONSHIP BETWEEN HEIGHT AND DISTANCE

CROSS-REFERENCE TO RELATED APPLICATION

The present application claims priority under 35 U.S.C. § 119 to Japanese Patent Application No. 2018-182902, filed on Sep. 27, 2018, the entire contents of which are incorporated herein by reference.

BACKGROUND OF THE INVENTION

1. Field of the Invention

The disclosures herein generally relate to a three-dimensional data generating apparatus, a recording medium, and a three-dimensional data generating method.

2. Description of the Related Art

As a method for fabricating a three-dimensional object, an inkjet method, fused deposition modeling, a rapid prototyping method, a binder jetting method, stereolithography, and a selective laser sintering method are known. Generally, such three-dimensional fabrication methods use three-dimensional shape information indicating a three-dimensional shape of a three-dimensional object to fabricate the three-dimensional object.

Examples of a method for creating three-dimensional shape information as described above include a method for creating three-dimensional shape information by measuring a sample object of a three-dimensional object to be fabricated, a method for creating three-dimensional shape information based on three-dimensional image data that indicates a three-dimensional object to be fabricated, and a method for creating three-dimensional shape information by adding height information to two-dimensional image data that indicates a three-dimensional object to be fabricated.

For example, Patent Document 1 describes a method for specifying a single apex of a two-dimensional shape represented by two-dimensional image data and specifying the height of the apex, such that a three-dimensional shape whose height changes from the periphery towards the apex is created.

However, in the technique described in Patent Document 1, the method for specifying a single apex can generate only a three-dimensional cone shape whose height changes from the periphery towards the single apex. In the above-described technique, with a simple operation, a degree of flexibility in creating three-dimensional shapes is low, and with a high degree of flexibility in creating three-dimensional shapes, a complicated operation is required.

RELATED-ART DOCUMENTS

Patent Documents

Patent Document 1: Japanese Unexamined Patent Application Publication No. 2017-120571

SUMMARY OF THE INVENTION

According to at least one embodiment, a three-dimensional data generating apparatus includes an input curve receiving unit configured to receive input of a curve indicating a relationship between a height and a distance from an outline of a target area to each position within the target area, a three-dimensional shape of the target area being generated from a two-dimensional image; and a three-dimensional data generating unit configured to calculate the height at each of the positions within the target area in accordance with the distance, the distance being calculated from a point on the outline to a corresponding position of the positions, and to generate data representing the three-dimensional shape of the target area based on the calculated height.

DESCRIPTION OF THE EMBODIMENTS

It is a general object of the present invention to provide a three-dimensional data generating apparatus, a recording medium, and a three-dimensional data generating method, in which three-dimensional image data is created by adding height information to two-dimensional image data in a simple and highly flexible manner.

In the following, embodiments of the present invention will be described with reference to the accompanying drawings.

FIGS. 1 through 5 are diagrams illustrating a three-dimensional fabrication system for fabricating a three-dimensional object by using data representing a three-dimensional shape generated by a three-dimensional data generating apparatus, a recording medium, and a three-dimensional data generating method according to the embodiments of the present invention.

<Three-Dimensional Fabrication System>

Figure 1:
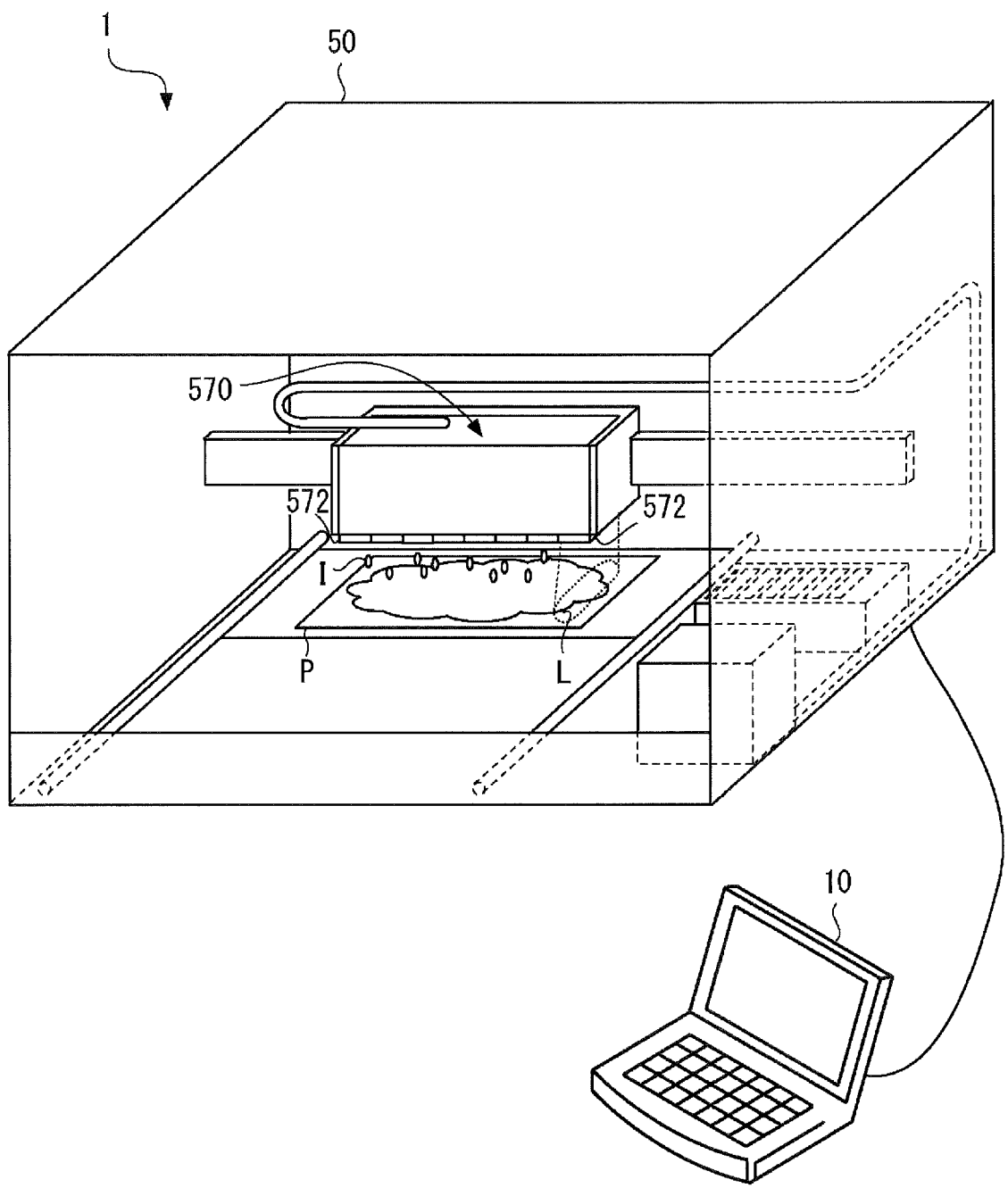
FIG. 1 is an external view of a three-dimensional fabrication system according to an embodiment.

A three-dimensional fabrication system according to an embodiment of the present invention will be described with reference to the drawings. FIG. 1 is an external view of a three-dimensional shaping fabrication 1 according to an embodiment. The three-dimensional fabrication system 1 includes a three-dimensional fabrication apparatus 50 and a computer 10.

For example, the computer 10 may be a general-purpose information processing apparatus such as a personal computer (PC) or a tablet, or may be an information processing apparatus dedicated to the three-dimensional fabrication apparatus 50. The computer 10 may be embedded in the three-dimensional fabrication apparatus 50. The computer 10 may be connected to the three-dimensional fabrication apparatus 50 by a cable. The computer 10 may be a server apparatus that communicates with the three-dimensional fabrication apparatus 50 via a network such as the Internet or an intranet. The computer 10 transmits data of an object to be fabricated to the three-dimensional fabrication apparatus 50 via the above-described connection or communication.

The three-dimensional fabrication apparatus is an inkjet type fabrication apparatus. The three-dimensional fabrication apparatus 50 includes a fabrication unit 570 that discharges a fabrication liquid I onto a medium P on a fabrication stage 595, in accordance with data of an object to be fabricated. Further, the fabrication unit 570 includes curing devices 572 that irradiate the fabrication liquid I discharged onto the medium P with light and cure the fabrication liquid I, such that a fabrication layer L is formed. The three-dimensional fabrication apparatus 50 repeats the process of discharging the fabrication liquid I onto the fabrication layer L and curing the discharged fabrication liquid I, and obtains a three-dimensional fabricated object.

The fabrication liquid I is formed of a material that is dischargeable by the three-dimensional fabrication apparatus 50, has shape stability, and is curable by light emitted from the curing devices 572. For example, if the curing devices 572 are ultraviolet irradiation apparatuses, a UV curable ink is used as the fabrication liquid I.

The medium P is formed of any material to which the discharged fabrication liquid I can be fixed. The medium P may be paper such as recording paper, a cloth such as canvas, or a plastic sheet.

<Three-Dimensional Fabrication Apparatus>

Figure 2:
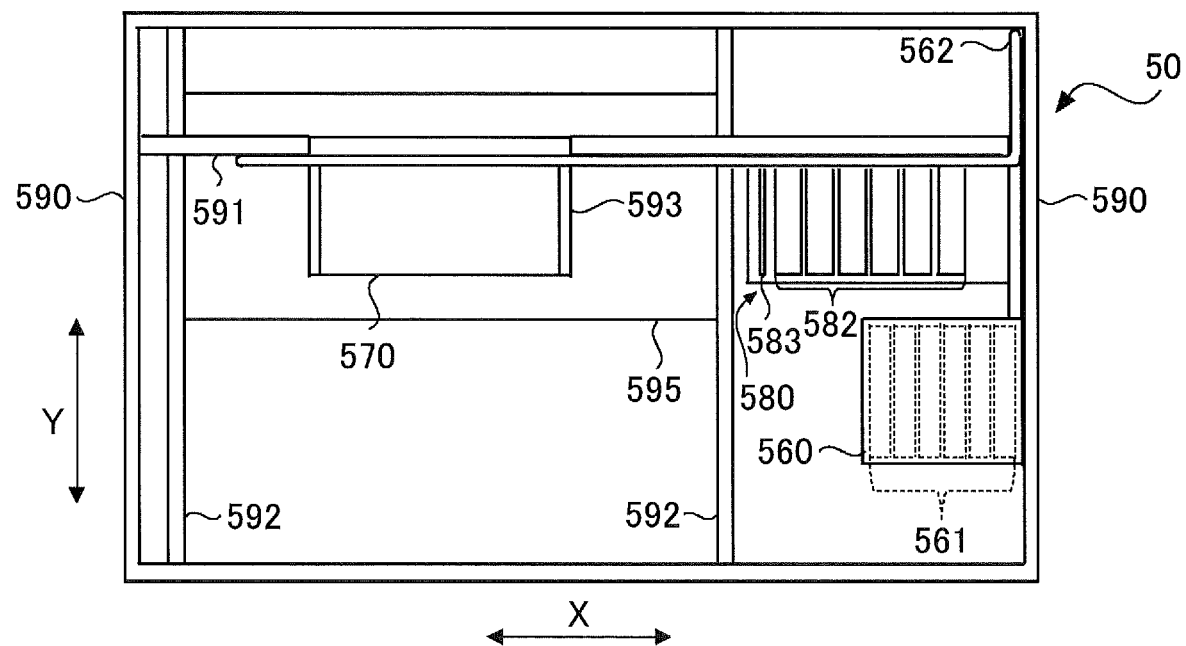
FIG. 2 is a plan view of the three-dimensional fabrication apparatus according to the embodiment.
Figure 3:
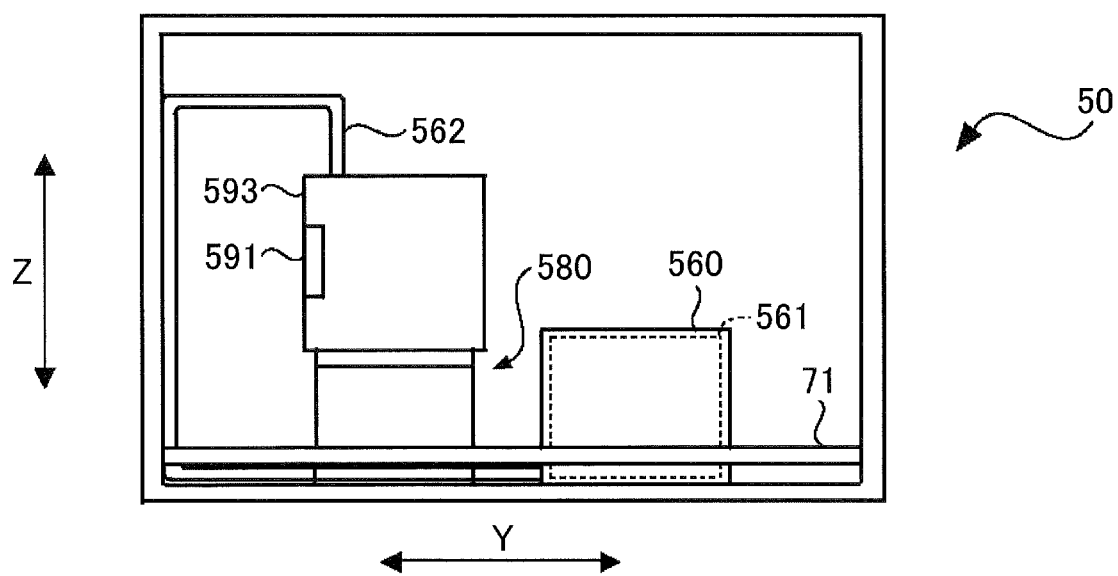
FIG. 3 is a side view of the three-dimensional fabrication apparatus according to the embodiment.
Figure 4:
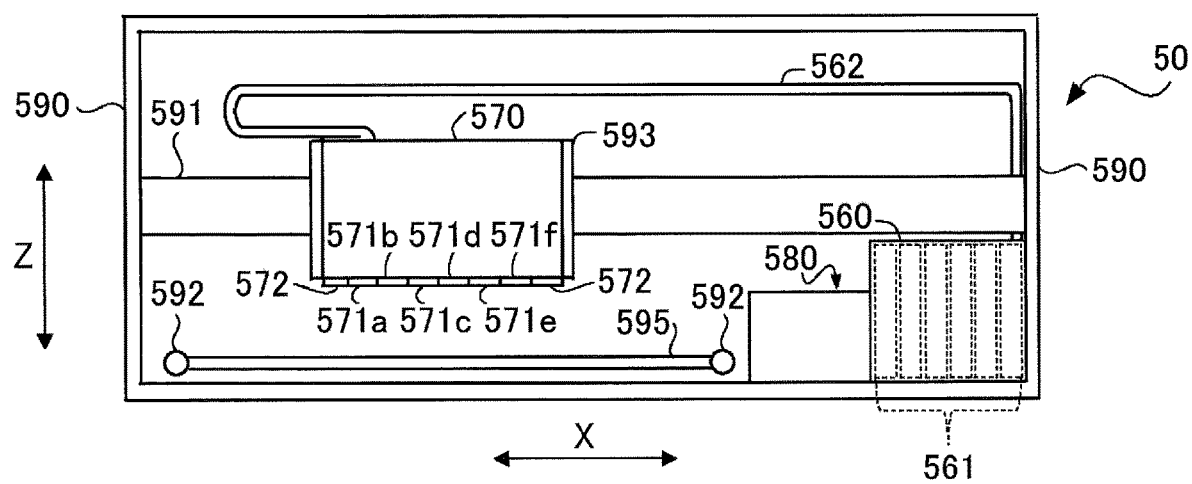
FIG. 4 is a front view of the three-dimensional fabrication apparatus according to the embodiment.

FIG. 2 is a plan view of the three-dimensional fabrication apparatus according to the embodiment. FIG. 3 is a side view of the three-dimensional fabrication apparatus according to the embodiment. FIG. 4 is a front view of the three-dimensional fabrication apparatus according to the embodiment. In order to illustrate an interior structure of the three-dimensional fabrication apparatus 50, the upper surface of a housing is not depicted in FIG. 2, the side surface of the housing is not depicted in FIG. 3, and the front surface of the housing is not depicted in FIG. 4.

A guide 591 is held between the both sides of the housing of the three-dimensional fabrication apparatus 50. A carriage 593 is movably held by the guide 591. A motor causes the carriage 593 to reciprocate in the direction indicated by an arrow X (hereinafter simply referred to as an "X-direction") via a pulley and a belt. Further, the direction indicated by an arrow Y is referred to as a Y-direction, and the direction indicated by an arrow Z is referred to as a Z-direction. It should be noted that the X-direction is also referred to as a "main scanning direction".

The fabrication unit 570 is held by the carriage 593 so as to be movable by the motor in the Z-direction, as illustrated in FIG. 3 and FIG. 4. The fabrication unit 570 includes six liquid discharge heads 571a, 571b, 571c, 571d, 571e, and 571f that are arranged in the X-direction from left to right in this order, and six different fabrication liquids are discharged from the respective liquid discharge heads. The liquid discharge heads are hereinafter simply referred to as "head(s)". Further, any liquid discharge head(s) of the liquid discharge heads 571a, 571b, 571c, 571d, 571e, and 571f are referred to as head(s) 571. The number of the heads 571 is not limited to 6, and one or more heads 571 are arranged in accordance with the number of fabrication liquids I.

The three-dimensional fabrication apparatus 50 includes a tank mount 560. Multiple tanks 561 are mounted on the tank mount 560, and the tanks 561 contain a first fabrication liquid, a second fabrication liquid, a third fabrication liquid, a fourth fabrication liquid, a fifth fabrication liquid, and a sixth fabrication liquid, respectively. The six fabrication liquids are supplied to the respective heads 571 through six supply tubes 562. The heads 571 each have nozzles or a nozzle array. From the nozzles, the heads 571 discharge the fabrication liquids supplied from the tanks 561. According to one embodiment, the heads 571a, 571b, 571c, 571d, 571e, and 571f discharge the first fabrication liquid, the second fabrication liquid, the third fabrication liquid, the fourth fabrication liquid, the fifth fabrication liquid, and the sixth fabrication liquid, respectively, from the nozzles.

The curing devices 572 are provided on both sides of the six heads 571 of the fabrication unit 570. The curing devices 572 cure the fabrication liquids, discharged from the heads 571 onto the medium P. The curing devices 572 may be any device as long as the fabrication liquids can be cured. Examples of the curing devices 572 include ultraviolet (UV) irradiation lamps and electron beam irradiation lamps. Examples of the lamps include high-pressure mercury lamps, ultra-high pressure mercury lamps, and metal-halide lamps. An ultra-high pressure mercury lamp is a point light source. However, when an ultra-high pressure mercury UV lamp is combined with an optical system, the UV lamp has high light utilization efficiency and is capable of emitting light in the short wavelength range. A metal-halide lamp has a wide wavelength range, and is thus effective. The metal-halide lamp contains metal halides such as Pb, Sn, and Fe in accordance with the absorption spectrum of a photoinitiator included in the fabrication liquids. The curing devices 572 each preferably include a mechanism that removes ozone generated by ultraviolet irradiation. It should be noted that the number of the curing devices 572 is not limited to 2, and any number of curing devices may be provided in accordance with, for example, whether or not the fabrication unit 570 reciprocates for fabrication. Further, only one of the two curing devices 572 may be operated.

Further, a maintenance assembly 580 that maintains and restores the heads 571 is provided at one side in the X-direction of the three-dimensional fabrication apparatus 50. The maintenance mechanism 580 includes a cap 582 and a wiper 583. The cap 582 makes contact with the nozzle surface (the surface on which the nozzles are formed) of the heads 571. In this state, by causing the maintenance mechanism 580 to suck the fabrication liquids I from the nozzles, the thickened fabrication liquids I stuck in the nozzles are discharged. Then, the wiper 583 wipes the nozzle surface to form a meniscus in each of the nozzles. The maintenance mechanism 580 covers the nozzle surface of the heads 571 with the cap 582 in order to prevent drying of the fabrication liquids I.

The fabrication stage 595 includes a slider movably held by two guides 592. A motor causes the fabrication stage 595 to reciprocate in the Y-direction (sub-scanning direction), perpendicular to the X-direction, via a pulley and a belt.

<Fabrication Liquids>

In the present embodiment, the above-described first fabrication liquid is black (K) ultraviolet curable ink as the key plate, the second fabrication liquid is cyan (C) ultraviolet curable ink, the third fabrication liquid is magenta (M) ultraviolet curable ink, the fourth fabrication liquid is yellow (Y) ultraviolet curable ink, the fifth fabrication liquid is clear (CL) ultraviolet curable ink, and the sixth fabrication liquid is white (W) ultraviolet curable ink. It should be noted that the number of the fabrication liquids is not limited to 6, and one or more fabrication liquids may be used in accordance with types of colors required to reproduce an image. If the number of the fabrication liquids is seven or more, the three-dimensional fabrication apparatus 50 may include one or more additional heads 571. If the number of the fabrication liquids is five or less, any one or more of the heads 571 may be not operated or is not required to be provided.

<Controller>

Figure 5:
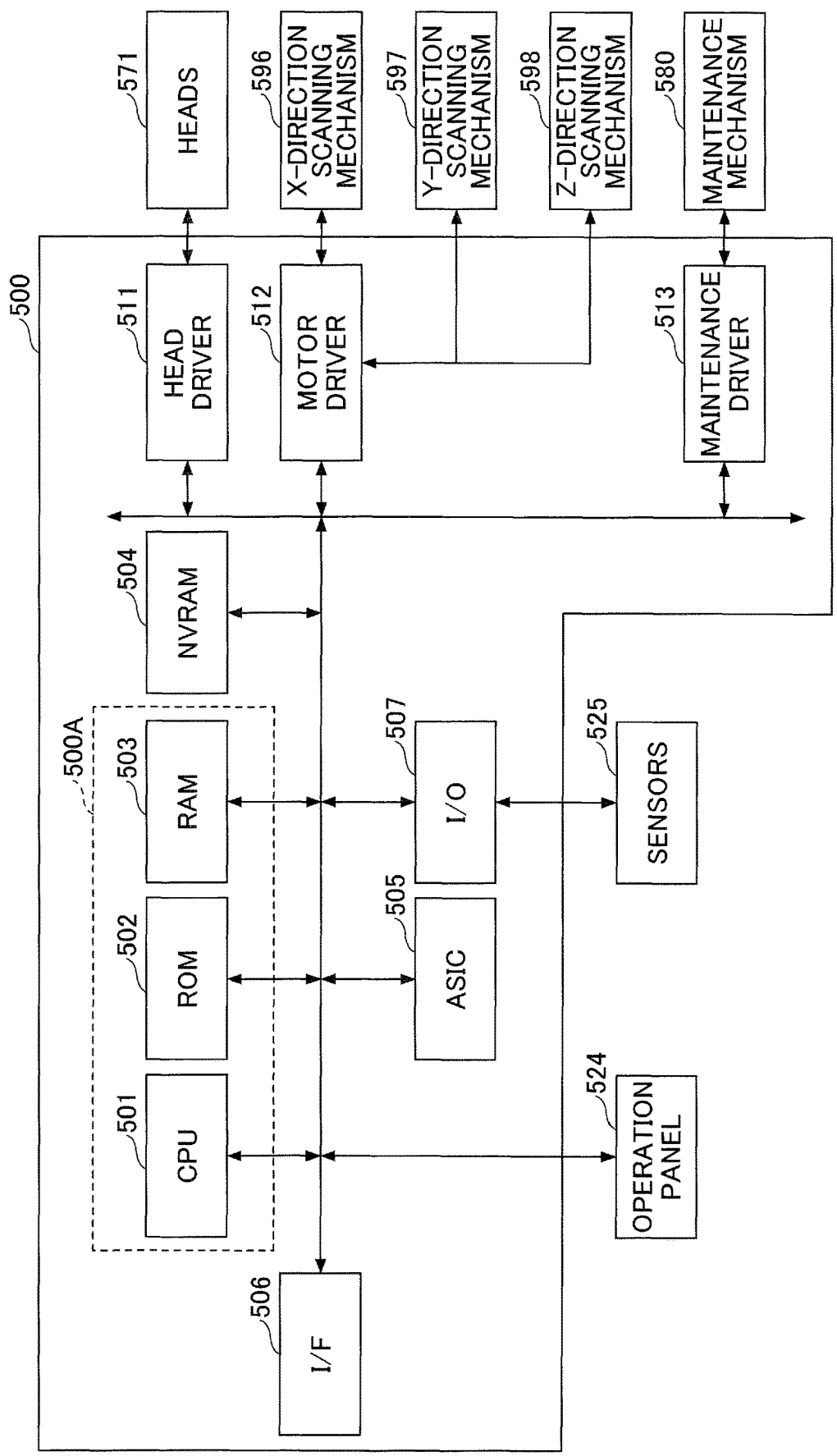
FIG. 5 is a diagram illustrating a hardware configuration of a controller of the three-dimensional fabrication apparatus.

Next, referring to FIG. 5, a hardware configuration of a controller of the three-dimensional fabrication apparatus 50 will be described. FIG. 5 is a diagram illustrating a hardware configuration of the three-dimensional fabrication apparatus 50.

The three-dimensional fabrication apparatus 50 includes a controller 500 that controls processes and operations of the three-dimensional fabrication apparatus 50. The controller 500 includes a central processing unit (CPU) 501, a read-only memory (ROM) 502, a random-access memory (RAM) 503, a non-volatile random access memory (NVRAM) 504, an application-specific integrated circuit (ASIC) 505, an interface (I/F) 506, and an input/output (I/O) unit 507.

The CPU 501 controls the entire processes and operations of the three-dimensional fabrication apparatus 50. The ROM 502 stores a program that causes the CPU 501 to control a three-dimensional fabrication operation and also stores other fixed data. The RAM 503 temporarily stores data of an object to be fabricated. A main controller 500A is configured by the CPU 501, the ROM 502, and the RAM 503. The main controller 500A executes processes according to the above program.

The NVRAM 504 retains data even when the power of the three-dimensional fabrication apparatus 50 is turned off. The ASIC 505 performs image processing, such as processing of various types of signals related to data of an object to be fabricated, and also performs processing of input and output signals so as to control the entire three-dimensional fabrication apparatus 50.

The I/F 506 is connected to the external computer 10, and transmits/receives data and signals transmitted to/from the computer 10. The data transmitted from the computer 10 includes data of an object to be fabricated. The interface (I/F) 506 may be connected to a network such as the Internet or an intranet, instead of directly connected to the external computer 10.

The I/O unit 507 is connected to various types of sensors 525, and inputs detection signals received from the sensors 525.

Further, an operation panel 524 for inputting and displaying information required for the three-dimensional fabrication apparatus 50 is connected to the controller 500.

Further, the controller 500 includes a head driver 511, a motor driver 512, and a maintenance driver 513, which are operated in accordance with commands from the CPU 501 or the ASIC 505.

The head driver 511 outputs image signals and drive voltages to the heads 571 of the fabrication unit 570 so as to control the discharge of the fabrication liquids I from the heads 571. The head driver 511 outputs the drive voltages to a mechanism that forms negative pressure in sub tanks, which retain the fabrication liquids I in the heads 571, and to a mechanism that controls pressing force. Further, a board may be mounted on the heads 571, and the board may be used to generate drive signals by masking drive voltages in accordance with an image signal.

The motor driver 512 drives a motor of an X-direction scanning mechanism 596, which causes the carriage 593 of the fabrication unit 570 to move in the X direction (the main scanning direction), by outputting a drive signal to the motor. Further, the motor driver 512 drives a motor of a Y-direction scanning mechanism 597, which causes the fabrication stage 595 to move in the Y-direction (the sub-scanning direction), by outputting a drive signal to the motor. Further, the motor driver 512 drives a motor of a Z-direction scanning mechanism 598, which causes the fabrication unit 570 to move in the Z-direction, by outputting a drive signal to the motor.

The maintenance driver 513 outputs a drive signal to the maintenance mechanism 580 so as to drive the maintenance mechanism 580.

The above-described units are electrically connected to each other through an address bus or a data bus.

<Three-Dimensional Data Generating Apparatus>

Figure 6:
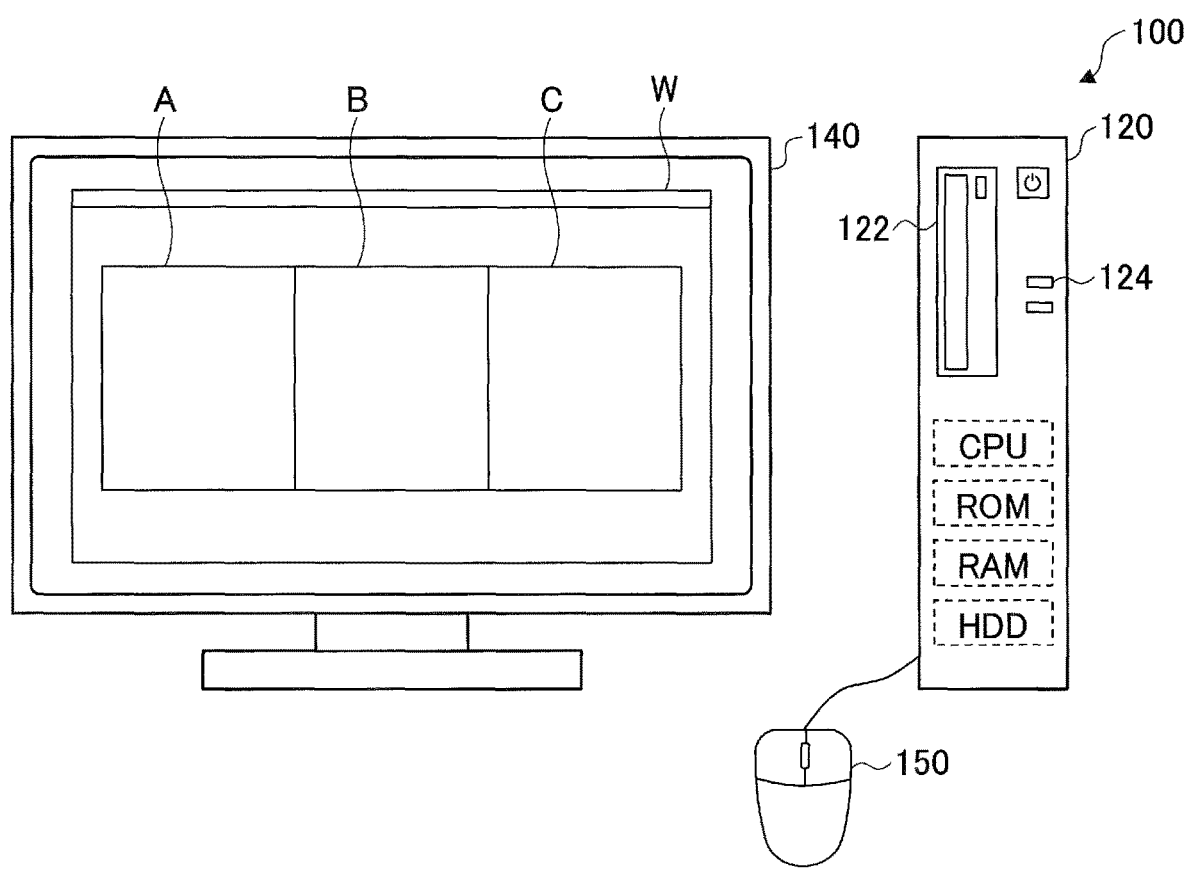
FIG. 6 is a schematic view of a three-dimensional data generating apparatus that implements a three-dimensional data generating method according to an embodiment.

FIG. 6 is a schematic view of a three-dimensional data generating apparatus that implements a three-dimensional data generating method according to an embodiment. A three-dimensional data generating apparatus 100 illustrated in FIG. 6 is, for example, a personal computer, and includes an apparatus body 120, a display device 140 such as a liquid-crystal display, and an input device 150 such as a mouse. Note that the input device 150 may be configured to include a graphics tablet and a stylus pen for operating the graphics tablet, or to include a graphics tablet and a mouse for operating the graphics tablet.

In addition, the three-dimensional data generating apparatus 100 may be a notebook personal computer into which the apparatus body 120 and the display device 140 are integrated, or may be a tablet terminal or a smartphone. If the three-dimensional data generating apparatus 100 is a notebook personal computer, a touchpad on a keyboard can be used as the input device 150. If the three-dimensional data generating apparatus 100 is a tablet terminal or a smartphone, a touch panel integrated into a display can be used as the input device 150. Further, the three-dimensional data generating apparatus 100 may be the computer 10 illustrated in FIG. 1.

For example, the apparatus body 120 includes a CPU, a ROM, a RAM, and a hard disk drive (HDD). By causing the CPU to execute a program for generating three-dimensional data stored in the ROM or the RAM, processes and operations described in FIG. and in the subsequent drawings are implemented. The program for generating three-dimensional data may also be hereinafter referred to as a three-dimensional data generating program. The apparatus body 120 includes, but is not limited to, a DVD drive 122 and a universal serial bus (USB) port 124, and is connected to a network such as the Internet (not illustrated).

In a case where the three-dimensional data generating method is implemented by the three-dimensional data generating program, which is executed by the CPU, the three-dimensional data generating program is stored in a recording medium such as a DVD, a CD-ROM, or a USE memory. The three-dimensional data generating program stored in the recording medium is loaded into the HDD via the DVD drive 122 or the USB port 124. Note that the three-dimensional data generating program may be loaded into the apparatus body 120 via a network such as the Internet.

The user, who generates a three-dimensional shape from a two-dimensional image, gives an instruction to start the three-dimensional data generating program by operating input devices such as a keyboard (not illustrated) and a mouse. In response to the user's instruction, the CPU starts executing the three-dimensional data generating program. The CPU displays, on the display device 140, a window W for generation of three-dimensional data. The window W includes areas A, B, and C. In the area A, a two-dimensional image is displayed together with a target area. A three-dimensional shape of the target area is created. In the area B, a curve for adding a height to the two-dimensional image is input. The area C displays an image of the three-dimensional shape formed based on the input into the areas A and B. The contents displayed in the areas A, B, and C will be described later in detail.

Figure 7:
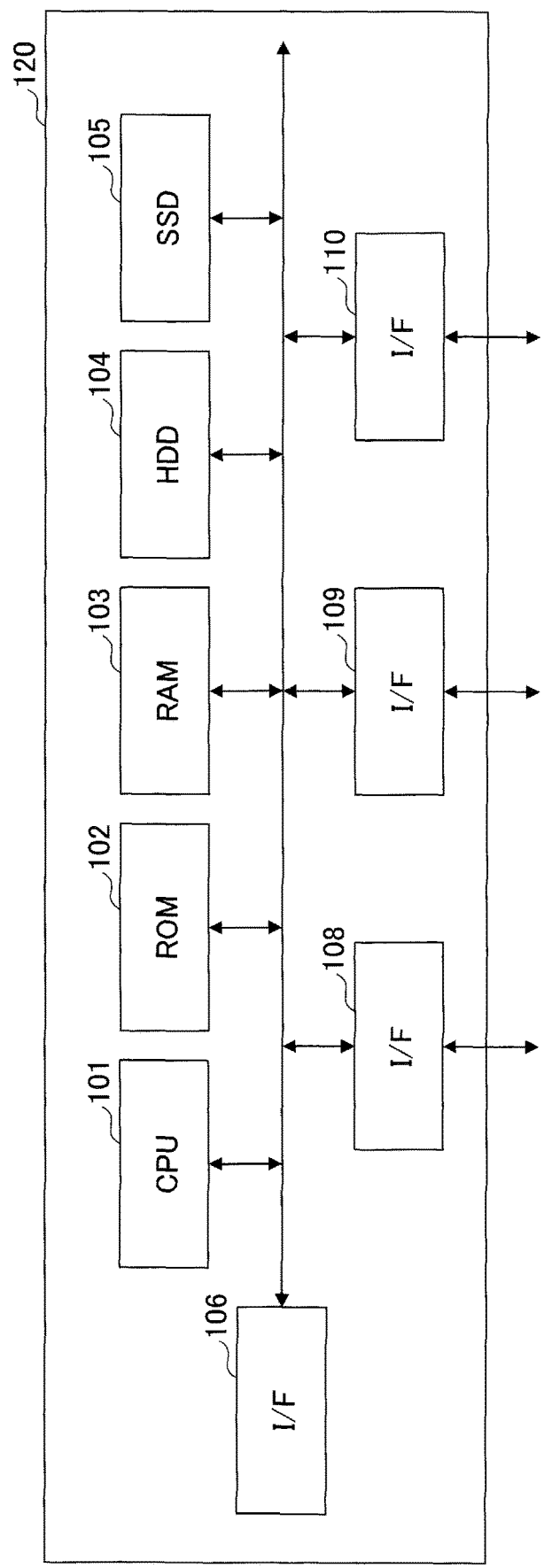
FIG. 7 is a diagram illustrating a hardware configuration of an apparatus body of FIG. 6.

FIG. 7 is a diagram illustrating a hardware configuration of the apparatus body 120. The apparatus body 120 includes a CPU 101, a ROM 102, and a RAM 103. The CPU 101 functions as a controller, and the ROM 102 and the RAM 103 function as main storage devices. In addition, the apparatus body 120 includes a HDD 104, a solid-state drive (SSD) 105, and an interface (I/F) 106. The HDD 104 and the SSD 105 function as auxiliary storage devices, and the I/F 106 functions as a communication device. The I/F 106 is connected to a network such as the Internet.

The CPU, the ROM, the RAM, and the HDD illustrated in FIG. 6 are the same as the CPU 101, the ROM 102, the RAM 103, and the HDD 104 illustrated in FIG. 7, respectively. The apparatus body 120 further includes an interface (I/F) 108 for the display device 140, and interfaces (I/Fs) 109 and 110 for the input devices such as the keyboard and the mouse. The above-described units are electrically connected to each other through an address bus or a data bus.

<Functional Configuration>

Figure 8:
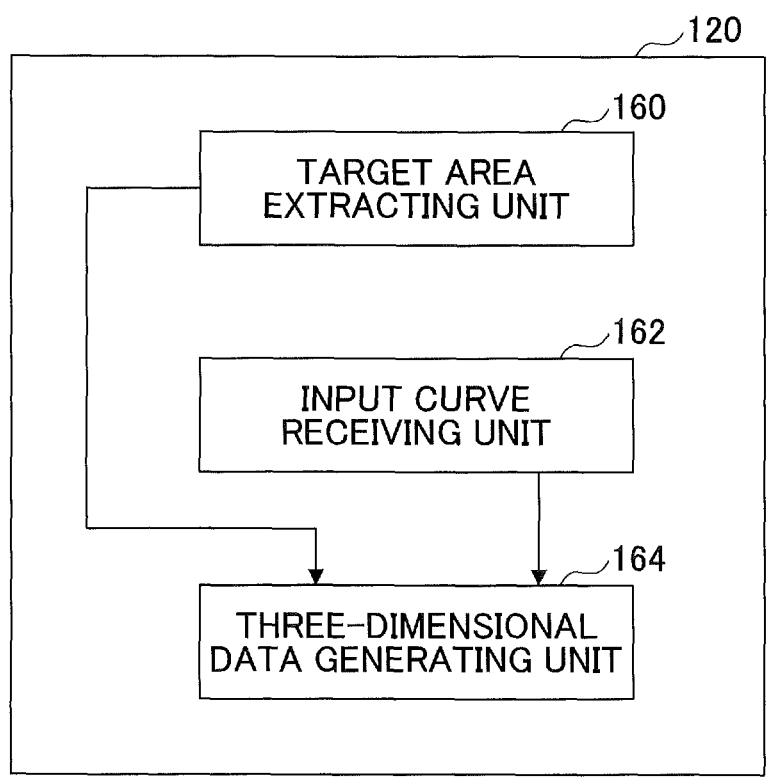
FIG. 8 is a block diagram illustrating an example of a functional configuration of the three-dimensional data generating apparatus of FIG. 6.

FIG. 8 is a block diagram illustrating an example of a functional configuration of the three-dimensional data generating apparatus 100 of FIG. 6. For example, the functional blocks illustrated in FIG. 8 are implemented by causing the CPU 101 of FIG. 7 to execute the three-dimensional data generating program. Note that the functional blocks illustrated in FIG. 8 may be implemented by hardware. As illustrated in FIG. 8, the apparatus body 120 includes a target area extracting unit 160, an input curve receiving unit 162, and a three-dimensional data generating unit 164.

The target area extracting unit 160 extracts a target area from a two-dimensional image displayed on the display device 140, such that a three-dimensional shape of the target area is generated from the two-dimensional image. The input curve receiving unit 162 receives the input of a curve indicating a relationship between the height and the distance from the outline to each position within the target area. Based on the curve received by the input curve receiving unit 162, the three-dimensional data generating unit 164 calculates the height at each of the positions in accordance with the distance from a point on the outline to a corresponding position of the positions. Based on the calculated heights, the three-dimensional data generating unit 164 generates data representing a three-dimensional shape of the target area.

<Operation of Generating Three-Dimensional Shape Data>

Figure 9:
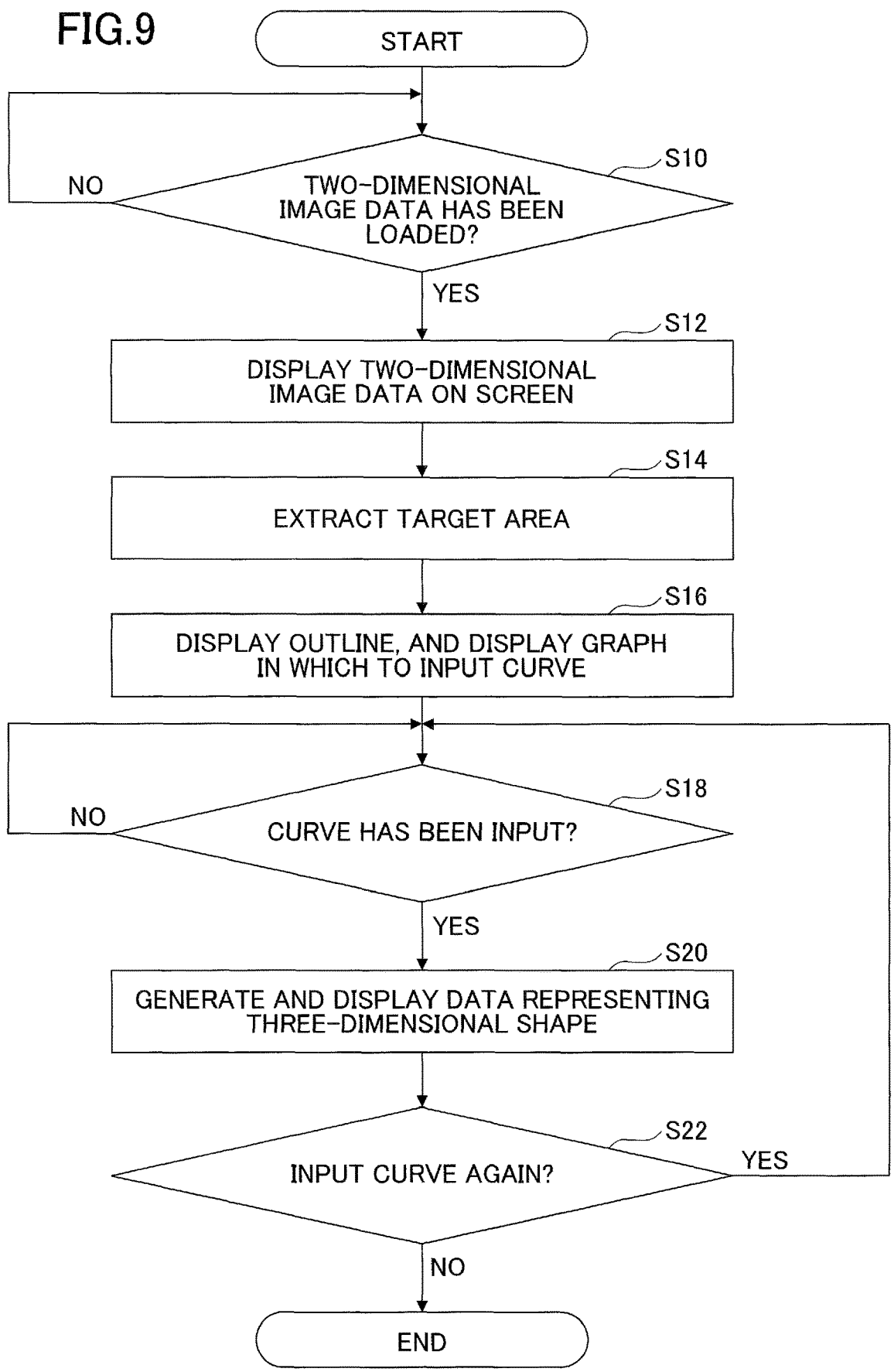
FIG. 9 is a flowchart illustrating the operation of the three-dimensional data generating apparatus of FIG. 6.

FIG. 9 is a flowchart illustrating an operation of the three-dimensional data generating apparatus 100 of FIG. 6. Specifically, FIG. 9 illustrates the three-dimensional data generating method and a process executed by the three-dimensional data generating program. For example, the flowchart illustrated in FIG. 9 is started by the CPU 101 in response to the start of the three-dimensional data generating program, and is implemented by the target area extracting unit 160, the input curve receiving unit 162, and the three-dimensional data generating unit 164. Note that the original two-dimensional image used to generate a three-dimensional shape is preliminarily stored in the HDD 104.

First, in step S10, the CPU 101 waits until two-dimensional image data is loaded into the RAM 103 in response to an instruction to load the two-dimensional image data stored in the HDD 104. When the two-dimensional image data is loaded into the RAM 103, the CPU 101 causes the process to proceed to step S12. For example, the instruction to load the two-dimensional image data is given by the user who operates the input device 150. Note that the two-dimensional image data is stored in the HDD 104 of the apparatus body 120 via a network connected to the three-dimensional data generating apparatus 100, a DVD inserted into the DVD drive 122, or a USB memory connected to the USB port 124.

In step S12, the CPU 101 displays, in the area A, the two-dimensional image data loaded into the RAM 103. Next, in step S14, the CPU 101 analyzes features of pixel values of the two-dimensional image data displayed in the area A, and extracts a target area. For example, the CPU 101 extracts, from the two-dimensional image data, pixels that include colors preliminarily specified by the user. Note that the CPU 101 may automatically extract pixels that include similar colors or similar gradations, or may extract a figure such as a rectangle or a circle and use the extracted figure as a target area. For example, step S14 is performed by the target area extracting unit 160 illustrated in FIG. 8.

Next, in step S16, the CPU 101 displays the outline of the extracted target area, such that the extracted target area overlaps the two-dimensional image displayed in the area A. In addition, the CPU 101 calculates the distance (maximum distance) from a position that is furthest from the outline, among a plurality of positions within the target area displayed in the area A. The plurality of positions may be pixels constituting the two-dimensional image, or may a group of a predetermined number of adjacent pixels. In the following, the positions within the target area are regarded as the pixels.

Subsequently, the CPU 101 displays, in the area B, a graph with the horizontal axis representing the distance from zero to maximum. The vertical axis of the graph represents the height. A relationship between the distance indicated by the length of the horizontal axis and the height indicated by the length of the vertical axis is set to a predetermined ratio (such as 1:1). The graph is an area in which to input a curve for generating a three-dimensional shape of the target area. Note that, instead of calculating the maximum distance, the CPU 101 may receive a value (distance) input by the user via the input device 150, and may set the received value to the maximum value on the horizontal axis of the graph. For example, step S16 may be performed by the input curve receiving unit 162, or may be performed by any other functional unit such as a graph displaying unit implemented by the three-dimensional data generating program.

Next, in step S18, the CPU 101 waits until the user inputs a curve in the graph displayed in the area B. When a curve is input, the CPU 101 causes the process to proceed to step S20. Namely, the CPU 101 receives the input of a curve indicating a relationship between the height and the distance from the outline of the target area. In other words, a line drawn in the graph is obtained as a curve. For example, step S18 is performed by the input curve receiving unit 162 illustrated in FIG. 8.

The CPU 101 stores, in the RAM, curve data indicating the curve (such as coordinates of the curve) input in the graph. The curve input in the graph includes at least any of a curve, a straight line, and a line chart. An example of inputting a curve will be described with reference to FIG. 10.

For example, when a graph is displayed in the area B in step S16, the CPU 101 draws a default straight line (such as a diagonal line of a graph), such that the height gradually changes from zero to the maximum distance on the horizontal axis of the graph. Subsequently, the user selects any one point on the default straight line at least once and moves the selected point by using the input device 150. As a result, the straight line is deformed and a curve is created. Note that the CPU 101 may input, as a curve, the trajectory of a pointer that moves on a graph in accordance with the operation of the mouse that is an example of the input device 150. As described above, the user can freely input a curve in the area B of the window W. For example, a curve can be very easily input by simply moving the pointer of the mouse on a graph.

In step S20, based on the target area extracted in step S14 and the curve input in step S18, the CPU 101 generates data representing a three-dimensional shape whose height changes in accordance with the distance from the outline of the target area. Namely, based on the input curve, the CPU 101 calculates a height at each position within the target area in accordance with a distance from each of the positions to a corresponding point on the outline of the target area. Based on the calculated heights, the CPU 101 generates data representing a three-dimensional shape of the target area.

The CPU 101 displays, in the area C, an image (such as a perspective view) indicating the three-dimensional shape, based on the generated data. For example, step S20 may be implemented by the three-dimensional data generating unit 164 illustrated in FIG. 8.

Next, in step S22, if an instruction to re-input a curve has been received from the user via the input device 150, the CPU 101 causes the process to return to step S18. If no instruction to re-input a curve has been received from the user (namely, if an instruction to finish editing has been received), the CPU 101 ends the process illustrated in FIG. 9. If the user is satisfied with the three-dimensional shape displayed in the area C, the user selects a finish editing button from a menu screen displayed on the window W. If the user is not satisfied with the three-dimensional shape displayed in the area C, the user selects a re-input button from the menu screen and inputs a curve again. When the curve is re-input, a three-dimensional shape corresponding to the curve is displayed in the area C in real time. Accordingly, the user can repeatedly input a curve until a satisfactory three-dimensional shape is obtained by checking a three-dimensional shape displayed in the area C.

Figure 10:
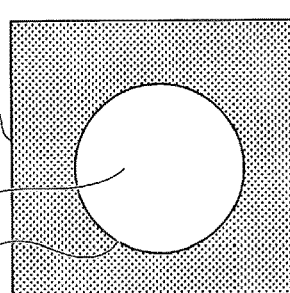
FIG. 10 is a diagram illustrating examples of generating three-dimensional shapes from two-dimensional images.

FIG. 10 is a diagram illustrating examples of generating three-dimensional shapes from two-dimensional images. In each of examples 1 and 2, a circular target area is extracted from a two-dimensional image displayed in the area A, and the outline of the target area is displayed within the two-dimensional image. Further, a graph in which to input a curve is displayed in the area B, and a curve is input by the user. For example, a diagonal line extending from the lower left to the upper right of the graph is a line displayed by default.

In each of the examples of FIG. 10, because the target area has a circular shape, the distance from the outline to the center of the circle becomes the largest. Therefore, in the graph displayed in the area B, the maximum value on the horizontal axis representing the maximum distance from the outline is equal to the distance from the outline to the center of the circle. The CPU 101 calculates distances from each pixel within the target area to a plurality of points forming the outline, and obtains, for example, the minimum distance. Namely, a point on the outline, which corresponds to the origin of the horizontal axis (the distance=0), is a point on the outline that is closest to a corresponding position (pixel) within the target area.

In example 1, a curve input in the area B indicates that the height increases from the outline towards the center, decreases in the middle, and increases again towards the center. The CPU 101 applies, to the graph, the minimum distance from each pixel to the outline, and calculates a height at a position of each of the pixels. As a result, in example 1, a three-dimensional shape whose height increases from the outline towards the center, decreases in the middle, and increases again towards the center is displayed in the area C. The target area defined by the outline serves as the bottom surface of the three-dimensional shape.

In example 2, a curve input in the area B indicates that the height increases from the outline towards the center in the form of an arch. The CPU 101 applies, to the graph, the minimum distance from each pixel to the outline, and calculates a height at a position of each of the pixels. As a result, in example 2, in accordance with the curve drawn in the area B, the area C displays a three-dimensional shape whose height increases from the outline towards the center and then decreases so as to form a recessed center portion. The target area defined by the outline serves as the bottom surface of the three-dimensional shape.

As illustrated in FIG. 10, when a target area has a circular shape, the distance from the outline to the center of the circle becomes the largest, and the distance from the outline decreases approaching the outline. Accordingly, a three-dimensional shape has a surface shape that corresponds to the trajectory of a curve when the graph is rotated around the vertical axis on the maximum distance side. Therefore, the user can readily identify a relationship between the input curve and the three-dimensional shape.

As illustrated in FIG. 10, according to the present embodiment, a curve indicating changes in height can be freely and readily input. Accordingly, it becomes possible to readily generate not only a three-dimensional shape whose height gradually increases towards the apex in a target area, but also a three-dimensional shape whose height decreases or increases at any position.

Figure 11:
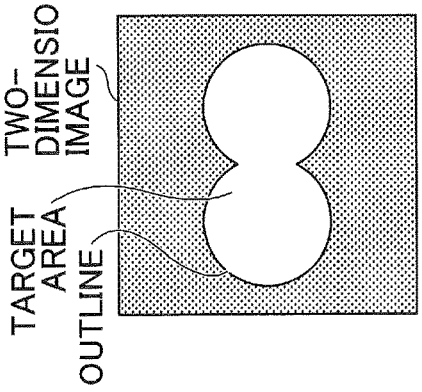
FIG. 11 is a diagram illustrating other examples of generating three-dimensional shapes from two-dimensional images.

FIG. 11 is a diagram illustrating other examples of generating three-dimensional shapes from two-dimensional images. A detailed description of elements and operations similar to those of FIG. 10 will be omitted. In each of examples 3 and 4, a target area, having a gourd shape in which two circles partially overlap, is extracted from a two-dimensional image displayed in the area A, and the outline of the target area is displayed within the two-dimensional image.

As in FIG. 10, the extracted target area is displayed in area A. A graph in which to input a curve is displayed in the area B. In example 3, a curve that is the same as the curve in example 1 of FIG. 10 is specified. In example 4, a curve that is the same as the curve in example 2 of FIG. 10 is specified. As illustrated in FIG. 11, when a target area has a gourd shape, the maximum value on the horizontal axis of the graph displayed in the area B is equal to the distance from the outline to the center of each of the two circles. Note that the maximum value of the distance from the outline is obtained by calculating the maximum value of the distance from the outline to each pixel.

In FIG. 11, the CPU 101 calculates distances from each pixel within the target area to a plurality of points forming the outline, and obtains, for example, the minimum distance. The CPU 101 applies, to the graph, the minimum distance from each of the pixels to the outline, and calculates a height at a position of each of the pixels.

In example 3, a three-dimensional shape having an apex at around the center of each of two circles forming the target area is displayed. In example 4, the area C displays a three-dimensional shape in the form of a figure eight, in which the center portion of each of two circles forming the target area is recessed.

As illustrated in FIG. 11, a curve indicating changes in height can be freely and readily input. Accordingly, it becomes possible to readily generate not only a three-dimensional shape whose height gradually increases towards the apex in a target area, but also a three-dimensional shape whose height decreases or increases at any position. Furthermore, even if a target area of any shape other than the circular shape and the gourd shape is extracted, a plurality of different three-dimensional shapes can be generated by inputting one curve.

Further, as illustrated in FIG. 10 and FIG. 11, a human-machine interface through which a curve is input (namely, the operation in the area B) is independent of the shape of a target area, and is used in the same way for any shape. Thus, once the user has learned the operation, the user can readily input a curve thereafter.

Three-dimensional data representing the three-dimensional shapes displayed in the area C in FIG. 10 and FIG. 11 is stored in the HDD 104. The three-dimensional data is transferred to the computer illustrated in FIG. 1. The computer 10 outputs the three-dimensional data to the three-dimensional fabrication apparatus 50 and causes the three-dimensional fabrication apparatus 50 to operate, thereby creating an object having a three-dimensional shape that corresponds to a curve set by the user. For example, if three-dimensional data includes color information, a color object is created.

Figure 12:
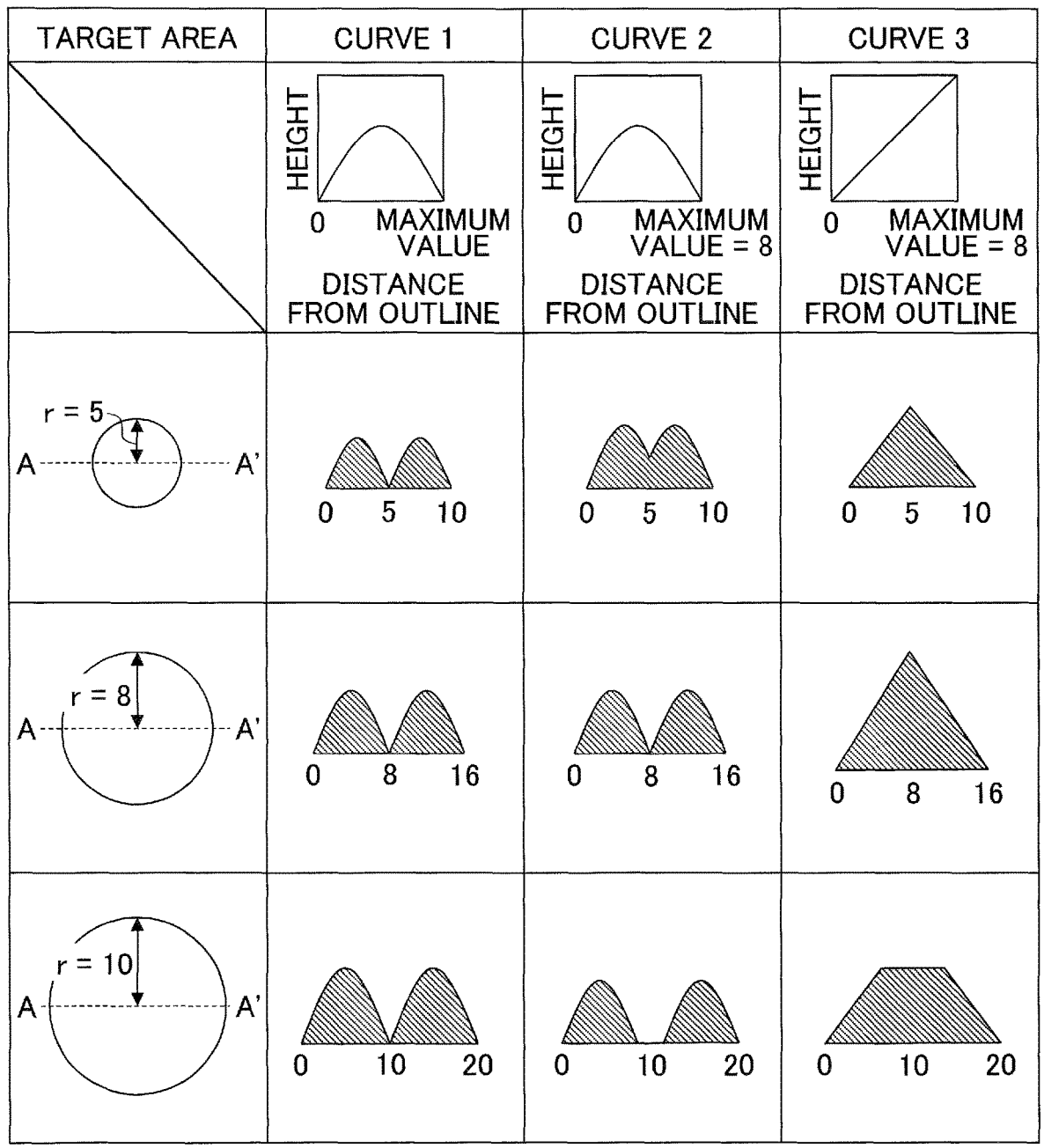
FIG. 12 is a diagram illustrating examples of three-dimensional shapes generated in accordance with sizes of target areas and curves.

FIG. 12 is a diagram illustrating examples of three-dimensional shapes generated in accordance with sizes of target areas and curves. In FIG. 12, it is assumed that circular target areas having respective radii r of "5", "8", and "10" are extracted in step S14 of FIG. 9. Figures indicated by hatched lines in FIG. 12 are cross sections taken through lines A-A' passing through the center of the target areas. A curve 1, a curve 2, and a curve 3 indicate curves input in the area B. As in FIG. 10 and FIG. 11, the CPU 101 applies, to a graph, the minimum distance from each pixel within a corresponding target area to the outline, and calculates a height at a position of each of the pixels.

As described in step S16 of FIG. 9, the maximum value of the curve 1 is the maximum distance calculated by the CPU 101, and changes in accordance with the size of each of the target areas. For example, the maximum value is equal to the radius of each of the target areas. As described above, as an alternative to step S16 of FIG. 9, the maximum value of the curve 2 and the maximum value the curve 3 are (distances) input by the user. In FIG. 12, "8" has been input.

In the case of the curve 1, the maximum value varies depending on the size of the target area, and data representing three-dimensional shapes each corresponding to the shape illustrated in example 2 of FIG. 10 is generated. In the case of the curve 2 and the target area with the radius r of "5", data representing a three-dimensional shape, having an approximately M-shaped vertical cross-section and having a recessed center portion centered on the height corresponding to the distance of "5", is generated. In the case of the curve 2 and the target area with the radius r of "8", data representing a three-dimensional shape is the same as that generated in the case of the curve 1 and the target area with the radius r of "8".

In the case of the curve 2 and the target area with the radius r of "10", the radius r exceeds the maximum value "8". In this case, heights at pixels exceeding the maximum value are set to the maximum value. Therefore, an area whose distance from the center is "2" is set to zero in height.

In the case of the curve 3 and the target area with the radius r of "5", data representing a three-dimensional cone shape, having a triangle-shaped vertical cross-section is generated and having the apex corresponding to the distance of "5" in the curve 3, is generated. In the case of the curve 3 and the target area with the radius r of "8", data representing a three-dimensional cone shape, having a triangular vertical cross-section and having the apex corresponding to the maximum value, is generated. In the case of the curve 3 and the target area with the radius r of "10", the radius r exceeds the maximum value. In this case, similar to the above example in which the radius r is "10" in the curve 2, heights at pixels exceeding the maximum value are set to the maximum value. Therefore, the height of an area whose distance from the center of the target area is "2" becomes a constant, and data representing a three-dimensional truncated cone shape is generated.

Figure 13:
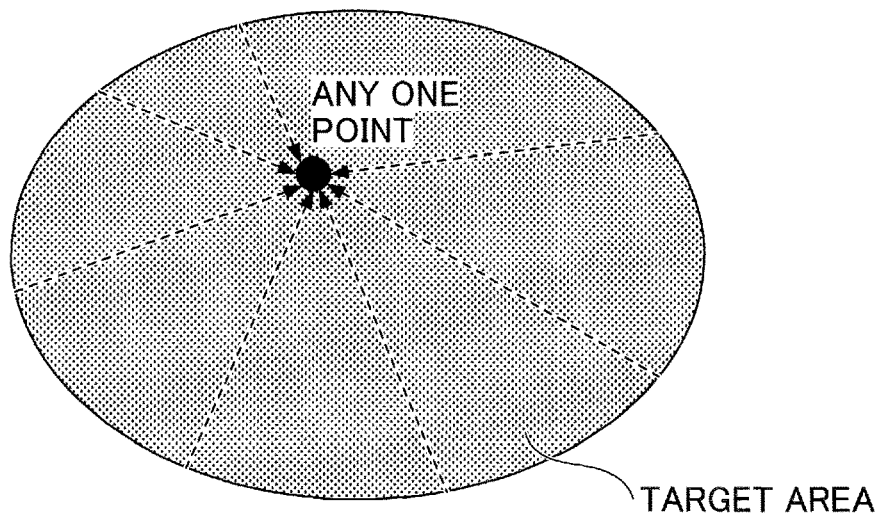
FIG. 13 is a diagram illustrating distances from any one point within a target area to the outline.

FIG. 13 is a diagram illustrating distances from any one point within a target area to the outline. As illustrated in FIG. 13, there are multiple distances from any one point (such as a pixel) to the outline. In the present embodiment, the height at the any one point is determined in accordance with the distance from the outline. Thus, it is required to determine what type of distance is used from among a plurality of possible types of distance. In the examples of FIG. 10 and FIG. 11, the CPU 101 obtains the minimum distance by calculating distances from each pixel within a target area to a plurality of points forming the outline. Subsequently, the CPU 101 applies, to a graph, the obtained minimum distance to each of the pixels, and calculates a height at a position of each of the pixels.

However, the CPU 101 may obtain the maximum distance by calculating distances from each pixel within a target area to a plurality of points forming the outline. Subsequently, the CPU 101 may apply, to a graph, the obtained maximum distance to each of the pixels, and calculate a height at a position of each of the pixels. Namely, a point on the outline, which corresponds to the origin of the horizontal axis representing the distance of a graph, may be a point on the outline that is furthest from a corresponding position within a target area.

Alternatively, the CPU 101 may apply, to a graph, an average value of distances from each pixel within a target area to a plurality of points forming the outline, and may calculate a height at a position of each of the pixels. Further, the window W illustrated in FIG. 6 may be provided with an additional area including a selection screen that allows the user to select the type of distance from each pixel to the outline. The types of distance include the shortest distance, the longest distance, and the average distance.

Depending on the type of distance, the distance from any one point within a target area to the outline becomes different. Therefore, even from the same curve, it is possible to create data representing three-dimensional images that have different shapes depending on the type of distance. Further, when the type of distance can be selected from a plurality of types of distance, the user can obtain three-dimensional objects having a plurality of shapes by simply inputting one curve.

Figure 14:
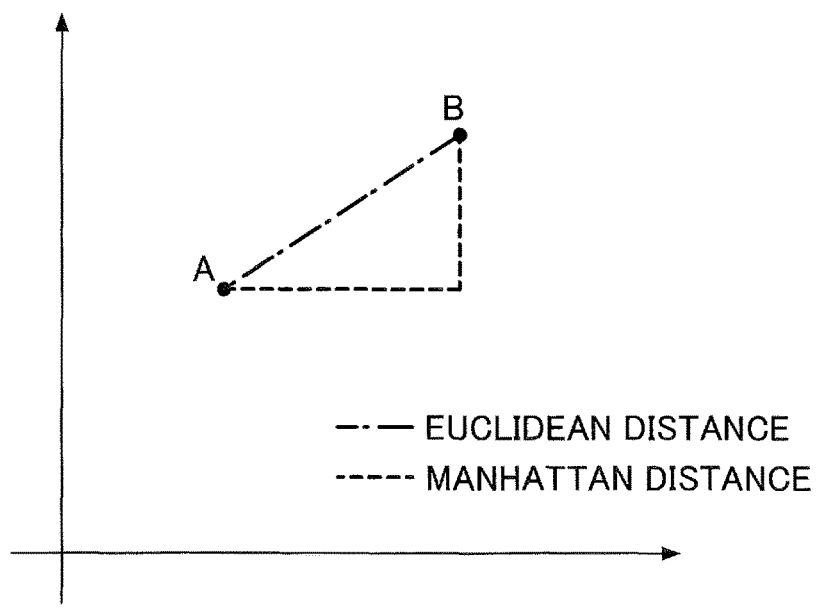
FIG. 14 is a graph illustrating a method for calculating a distance from each point within a target area to the outline.

FIG. 14 is a graph illustrating a method for calculating a distance from each point to the outline of a target area. As a method for calculating a distance between two points A and B, the Euclidean distance between two points on a straight line or the Manhattan distance between two points along the axes may be used. As the method for calculating a distance is associated with a method for determining the height at each point within a target area, the value of the height at each of the points becomes different depending on the method for calculating the distance. Therefore, the final shape of an object to be fabricated becomes different. For this reason, the window W illustrated in FIG. 6 may be provided with an additional area including a selection screen that allows the user to select a method for calculating a distance.

As illustrated in FIG. 14, by changing the method for calculating a distance, it is possible to create data representing three-dimensional images of different shapes, even from the same curve.

According to the embodiment illustrated in FIG. 1 through FIG. 14, the user can freely and readily input a curve by using the area B of the window W, and can generate various three-dimensional shapes each having a height that increases or decreases in accordance with the curve. Namely, a three-dimensional shape can be readily created in a highly flexible manner by using two-dimensional image data.

By changing the method for calculating a distance from any one point within a target area to the outline, it is possible to create data representing three-dimensional images having different shapes, even from the same curve. Further, by allowing the user to select the type of distance from a plurality of types of distance, it is possible to obtain three-dimensional objects having a plurality of shapes from one curve.

Figure 15:
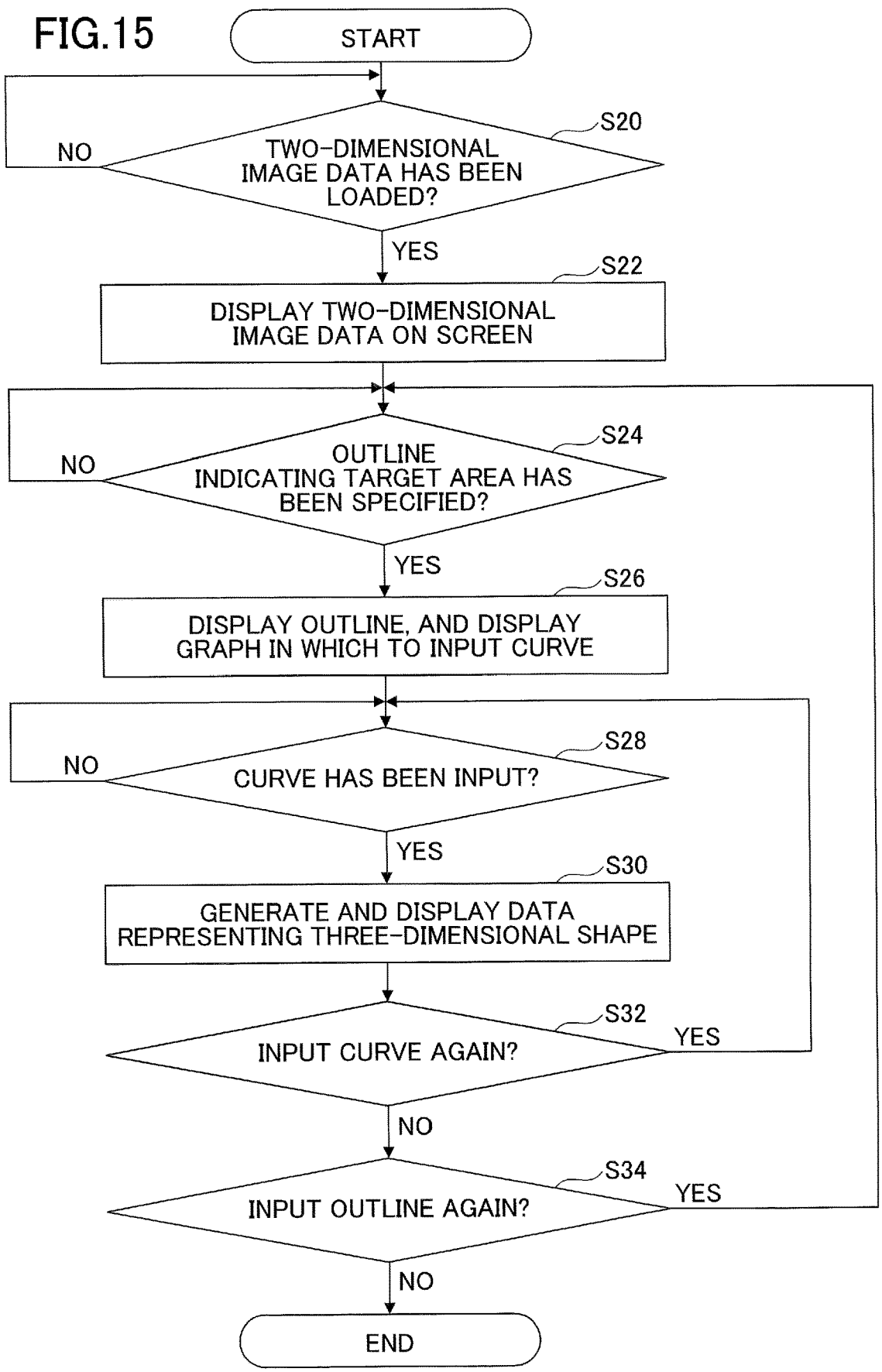
FIG. 15 is a flowchart illustrating the operation of a three-dimensional data generating apparatus according to another embodiment.

FIG. 15 is a flowchart illustrating the operation of a three-dimensional data generating apparatus according to another embodiment. Specifically, FIG. 15 illustrates a three-dimensional data generating method and a process executed by the three-dimensional data generating program. A detailed description of steps same as the steps of FIG. 9 will be omitted. For example, as in FIG. 9, the CPU 101 starts the flowchart illustrated in FIG. in response to the start of a three-dimensional data generating program. Note that the original two-dimensional image used to generate a three-dimensional shape is preliminarily stored in the HDD 104.

A configuration of the three-dimensional data generating apparatus that performs the process illustrated in FIG. 15 is the same as the configuration of the three-dimensional data generating apparatus 100 illustrated in FIG. 6, FIG. 7, and FIG. 8, except that the three-dimensional data generating program is different. Further, examples for generating three-dimensional shapes from two-dimensional images are the same as those illustrated in FIG. 10, FIG. 11, and FIG. 12, except that a target area is extracted based on the outline specified by the user.

Step S20 and step S22 are the same as step S10 and step S12 illustrated in FIG. 9. After step S22, the CPU 101 waits until an outline indicating a target area is specified in a two-dimensional image displayed in the area A by the user via the input device 150 such as the mouse, in step S24. Namely, in the present embodiment, instead of automatically extracting a target area, the CPU 101 receives the input of an outline indicating a target area for generating a three-dimensional shape from a two-dimensional image displayed in the area A.

When the outline has been input, the CPU 101 extracts a target area based on the outline that has been input. Note that a target area is not necessarily extracted based on the outline drawn by using the input device 150. For example, pixels including colors or gradations similar to those included in an area selected by the user through the input device 150 may be extracted as a target area. Alternatively, the user may select a figure such as a rectangle or a circle within a two-dimensional image by using the input device 150, and the selected figure may be extracted as a target area. Any method may be used to specify a target area, as long as the target area having the outline can be extracted.

When the target area has been specified, the CPU 101 stores information (such as coordinate information) indicating the outline of the specified target area in the RAM or the like, and causes the process to proceed to step S26. As used herein, the term "outline" means a boundary between a target area and the outside of the target area.

Steps S26, S28, S30, and S32 are the same as steps S16, S18, S20, and S22 illustrated in FIG. 9, respectively, except that, if an instruction to re-input a curve has not been received from the user in step S32, the process proceeds to step S34.

In step S34, if an instruction to re-input an outline indicating a target area has been received from the user via the input device 150, the CPU 101 causes the process to return to step S24. Further, if an instruction to re-input an outline has not been received from the user (namely, if an instruction to finish editing has been received), the CPU 101 causes the process illustrated in FIG. 15 to end. If the user is satisfied with a three-dimensional shape displayed in the area C, the user selects a finish editing button from the menu screen. If the user is not satisfied with a three-dimensional shape displayed in the area C, the user selects, from the menu screen, a re-input button for inputting a curve again or a re-input button for inputting an outline again.

Note that if an instruction to re-input an outline indicating a target area has been received, step S28 may be omitted and the previously input curve may be used. When the outline is input again, a three-dimensional shape of the target area indicated by the re-input outline can be displayed in the area C in real time. Accordingly, the user can repeatedly input an outline until a satisfactory three-dimensional shape is obtained by checking a three-dimensional shape displayed in the area C.

As described above, in the embodiment illustrated in FIG. 15, a similar effect to that of the embodiment illustrated in FIG. 1 through FIG. 14 can be obtained. Namely, the user, who generates a three-dimensional shape, can freely and readily input a curve in the area B of the window W, and can readily generate different three-dimensional shapes each having a height that increases or decreases in accordance with the curve.

Further, in the embodiment illustrated in FIG. 15, a target area can be extracted based on an outline specified by the user. Accordingly, data of a three-dimensional shape of any size can be readily created in accordance with the user's preference.

Figure 16:
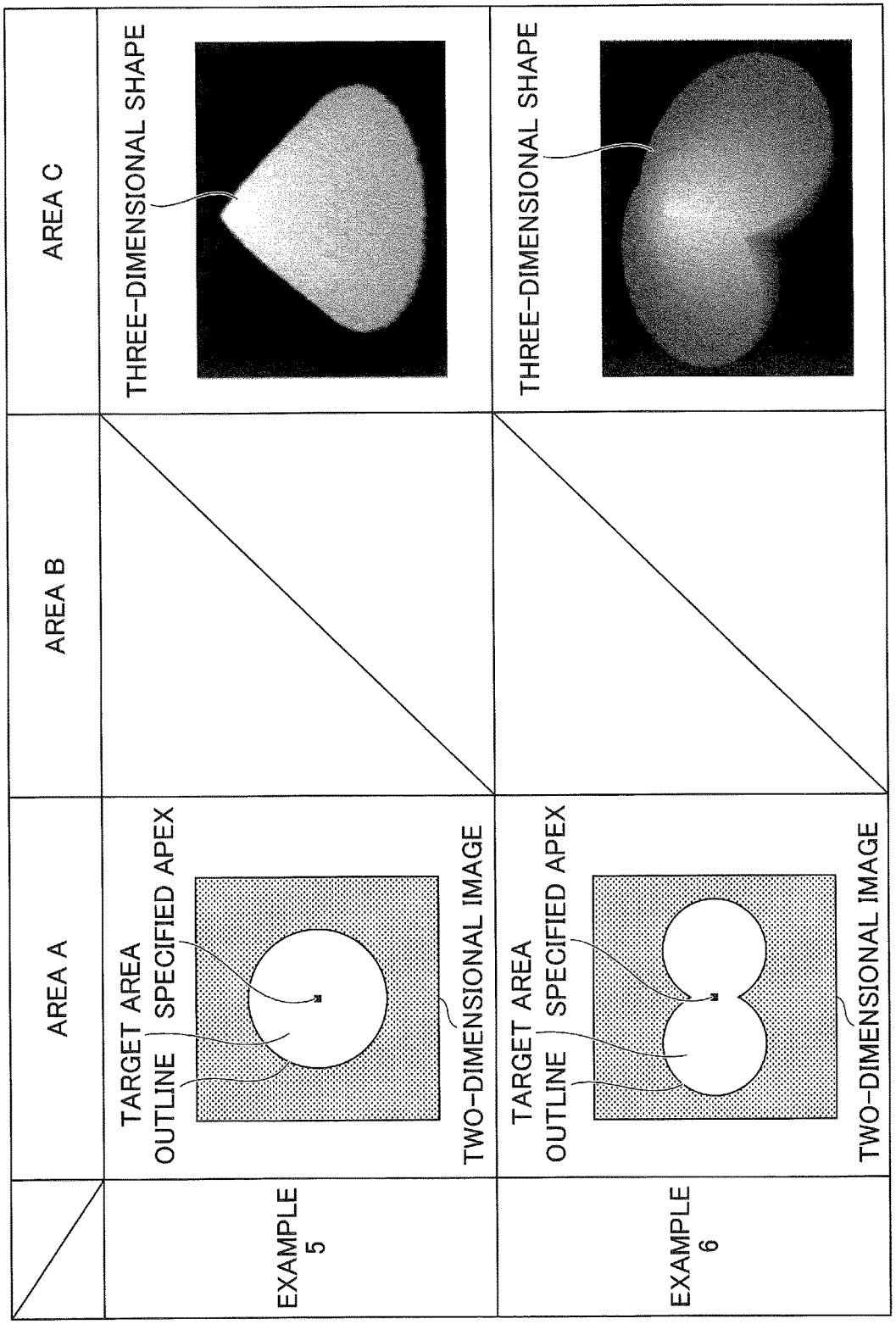
FIG. 16 is a diagram illustrating a method for generating data of three-dimensional shapes when the technique according to the above-described embodiments is not used.

FIG. 16 is a diagram illustrating a method for generating data of three-dimensional shapes when the technique according to the above-described embodiments is not used. A detailed description of elements and operations same as those of FIG. 10 and FIG. 11 will be omitted. In FIG. 16, a graph is not used to input a curve, and thus, there is no area B.

In example 5 illustrated in FIG. 16, a circular target area is extracted from a two-dimensional image displayed in the area A, as in FIG. 10. Further, the apex of a three-dimensional shape is specified in the target area, and the specified apex is displayed in the target area. The three-dimensional shape, whose height changes from the outline towards the apex in accordance with the specified apex, is generated and displayed in the area C. The target area defined by the outline serves as the bottom surface of the three-dimensional shape.

In example 6 illustrated in FIG. 16, as in FIG. 11, a target area, having a gourd shape in which two circles partially overlap, is extracted from a two-dimensional image displayed in the area A, and the outline is displayed within the two-dimensional image. Further, the apex of a three-dimensional shape is specified in the target area, and the specified apex is displayed in the target area. The three-dimensional shape is generated and displayed in the area C in accordance with the specified apex. The height of the generated three-dimensional shape changes from the outline towards the apex, and the target area serves as the bottom surface of the generated three-dimensional shape.

As illustrated in FIG. 16, only a three-dimensional cone shape can be created by specifying one apex. Thus, flexibility in creating three-dimensional shapes is low.

According to at least one embodiment, it is possible to provide a three-dimensional data generating apparatus, a recording medium, and a three-dimensional data generating method, in which three-dimensional image data is created by adding height information to two-dimensional image data in a simple and highly flexible manner.

Although the present invention has been described based on the embodiments, the present invention is not limited to the above-described embodiments. The embodiments may be modified without departing from the scope of the present invention and may be appropriately defined according to the application forms.

What is claimed is:

1. A three-dimensional data generating apparatus comprising:
   a processor configured to:
   receive input of a curve indicating a relationship between a height and a distance starting from an outline of a target area to each of positions within the target area, a three-dimensional shape of the target area being generated from a two-dimensional image; and
   calculate the height at each of the positions within the target area in accordance with the distance, the distance being calculated from a point on the outline to a corresponding position of the positions, and generate data representing the three-dimensional shape of the target area based on the calculated height,
   wherein the processor is configured to generate a window to receive an instruction as to whether the distance is calculated by obtaining a shortest distance, a longest distance, and an average distance from the outline of the target area to each of positions within the target area.

2. The three-dimensional data generating apparatus according to claim 1, wherein the point on the outline is a closest point on the outline to the corresponding position of the positions.

3. The three-dimensional data generating apparatus according to claim 1, wherein the point on the outline is a furthest point on the outline from the corresponding position of the positions.

4. The three-dimensional data generating apparatus according to claim 1, wherein a graph having a horizontal axis and a vertical axis is displayed, and a line that is drawn in the graph is obtained as the curve, one of the horizontal axis and the vertical axis representing the distance and another one of the horizontal axis and the vertical axis representing the height.

5. The three-dimensional data generating apparatus according to claim 4, wherein input of a maximum value on an axis that represents the distance in the graph is received, and a height at a point whose distance from the outline exceeds the maximum value within the target area is set to the maximum value on the axis.

6. The three-dimensional data generating apparatus according to claim 4, wherein distances from a plurality of points on the outline of the target area to each of the positions within the target area are calculated, and a maximum distance of the calculated distances is set to a maximum value on an axis that represents the distance in the graph.

7. The three-dimensional data generating apparatus according to claim 1, wherein the processor is further configured to receive a plurality of heights for a plurality of distances, said plurality of heights being determined by a user of the three-dimensional data generating apparatus by moving up and down any points on a default straight line.

8. The three-dimensional data generating apparatus according to claim 1, wherein the height decreases at least once before the distance reaches the maximum value.

9. A non-transitory recording medium storing a program for causing a computer to execute a process comprising:
   receiving input of a curve indicating a relationship between a height and a distance starting from an outline of a target area to each of positions within the target area, a three-dimensional shape of the target area being generated from a two-dimensional image;
   calculating the height at each of the positions within the target area in accordance with the distance, the distance being calculated from a point on the outline to a corresponding position of the positions, and generating data representing the three-dimensional shape of the target area based on the calculated height, and
   generating a window to receive an instruction as to whether the distance is calculated by obtaining a shortest distance, a longest distance, and an average distance from the outline of the target area to each of positions within the target area.

10. A three-dimensional data generating method comprising:
   receiving input of a curve indicating a relationship between a height and a distance starting from an outline of a target area to each of positions within the target area, a three-dimensional shape of the target area being generated from a two-dimensional image;
   calculating the height at each of the positions within the target area in accordance with the distance, the distance being calculated from a point on the outline to a corresponding position of the positions, and generating data representing the three-dimensional shape of the target area based on the calculated height, and generating a window to receive an instruction as to whether the distance is calculated by obtaining a shortest distance, a longest distance, and an average distance from the outline of the target area to each of positions within the target area.

* * * * *